United States Patent [19]
Kiyono

[11] Patent Number: 5,978,743
[45] Date of Patent: Nov. 2, 1999

[54] SELF-CALIBRATION METHOD FOR A SENSOR

[75] Inventor: Satoshi Kiyono, Sendai, Japan

[73] Assignee: Mitutoyo Corporation, Kawasaki, Japan

[21] Appl. No.: 09/084,221

[22] Filed: May 26, 1998

[30] Foreign Application Priority Data

May 30, 1997 [JP] Japan ................................ 9-142638

[51] Int. Cl.[6] ........................... G01D 3/00; G01D 18/00; G01B 21/00
[52] U.S. Cl. .............................. 702/86; 702/85; 702/108; 702/104; 340/870.05
[58] Field of Search .............................. 702/85, 86, 108, 702/116, 127, 104; 73/1.01; 340/870.05

[56] References Cited

U.S. PATENT DOCUMENTS

| | | | |
|---|---|---|---|
| 4,800,513 | 1/1989 | Deutsch | 702/107 |
| 5,361,218 | 11/1994 | Tripp et al. | 702/88 |
| 5,742,921 | 4/1998 | Oo et al. | 701/102 |

Primary Examiner—John Barlow
Assistant Examiner—Hien Vo
Attorney, Agent, or Firm—Oliff & Berridge, PLC

[57] ABSTRACT

The method of self-calibrating for a sensor without using an additional device by using data sampling, an approximate value of linear errors obtained by performing the numerical integration of approximate values of a linear-error derivative, correcting the approximate value of the input value at each sampling point, and repeating the processing for correcting the approximate value of the linear error by necessary times.

11 Claims, 17 Drawing Sheets

5,978,743

SELF-CALIBRATION METHOD FOR A SENSOR

BACKGROUND OF THE INVENTION

1. Field of the Invention

The present invention relates to a self-calibration method for sensors such as a displacement sensor, an angular sensor and so on.

2. Related Art

In developing displacement sensors and angular sensors on the order of nanometers and nano-radians, in addition to improving the accuracy thereof, it is difficult to obtain a calibration criterion that assures the accuracy thereof. Conventionally, to calibrate wavelength interpolation error of an interference displacement meter, a method using an X-ray interferometer (D. K. Bowen et al, "Subnanometer transducer characterization by X-ray interferometry", Precision Engineering, 12, 3 (1990) 165) and a non-linearity error compensating method using a linear drive range of a PZT (W. How and G. Wilkening, "Investigation and compensation of the non-linearity of heterodyne intergerometers", Precision Engineering, 14, 2 (1992) 91) have been proposed.

However, it is difficult for users to use the former method. On the other hand, in the latter method, it is difficult to determine whether or not calibrations have been correctly performed. In addition, most of such precision sensors require precise adjustments. Therefore, it is necessary to calibrate them in situ condition in such a manner that they are mounted in units. However, the conventional methods do not satisfy such needs.

To solve such a problem, the inventor of the present invention has proposed a self-calibration method for linearity errors of displacement sensors and angular sensors. In general, to obtain calibration data of a conventional sensor, a sensor system that has a higher accuracy than a sensor to be calibrated is required. In the self-calibration method, such an accurate sensor system is not required. The self-calibration that the inventor of the present invention has proposed are described in (1) Kiyono, Morishima, and Sugibuchi, "Self-calibration method against linearity errors for displacement meters", Journal of the Japan Society for Precision Engineering, 59, 12 (1993) 2043, (2) Kiyono, Ge, and Nishino, "High accuracy of interferometer by self-calibration of interpolation error", Journal of the Japan Society for Precision Engineering, 62, 2 (1996) 279, (3) Kiyono and Zhang, "Study of high accuracy self-calibration method for angular sensor", Journal of the Japan Society for Precision Engineering, 60, 11 (1994) 1591, and so forth.

In the self-calibration method for a displacement sensor, a reference sensor that is the same type of a sensor to be calibrated (hereinafter referred to as object sensor) is prepared. In addition, a lever system that allows the reference sensor to detect the n times the displacement of the object sensor is used. Thus, when the object sensor is calibrated with the reference sensor, the linearity error of the calibration result is decreased to 1/n by the lever system. By repeating the mutual calibrations, the linearity error can be converged to almost zero.

In the self-calibration method that the inventors of the present invention have proposed, the lever system that enlarges the calibration input values and the object sensor are required. Thus, it is difficult to calibrate a sensor in situ condition that the sensor is mounted in a unit. To accomplish such in situ calibration, a method that does not require an additional sensor and a lever system is desired.

SUMMARY OF THE INVENTION

An object of the present invention is to provide a self-calibration method for a sensor, that allows a linearity error of the sensor to be accurately measured using data sampling, an approximate calculation, and a convergence calculation without need to use an extra space and additional apparatus or additional sensor.

A first aspect of the present invention is a self-calibration method for a sensor whose calibration curve is expressed by $f(x)=v=Sm \cdot x+g(x)$, where x represents an input value; v represents an output value; Sm represents an average sensitivity; and g(x) represents a linearity error, the method comprising the steps of: (a) sampling output values vi (where i=1, 2, ..., n) of the sensor at a plurality of first sampling points in a predetermined calibration range of the sensor; (b) sampling output values $vi_+$ of the sensor at a plurality of second sampling points in the predetermined calibration range of the sensor, input interval between each of the first and second sampling points being $\Delta x$; (c) calculating input approximation $x0i \approx vi/Sm$ at each of the first sampling points using the output values vi; (d) calculating derivative approximation $g'0(x0i) \approx \Delta vi/\Delta x - Sm$ of the linearity errors g(x) using difference $\Delta vi = vi_+ - vi$; (e) numerically integrating the derivative approximation $g'0(x0i)$ so as to obtain linearity error approximation $g0(x) = \Sigma g'0(x0i)$ of the linearity error g(x); and (f) repeatedly improving the linearity error approximation g0(x) until a predetermined convergence condition is satisfied, in such a manner as to improve the input approximation x0i using the linearity error approximation g0(x), then improve the derivative approximation $g'0(x0i)$ using the resultant input approximation, and then improve the linearity error approximation g0(x) using the resultant derivative approximation.

The input interval $\Delta x$ is, for example, obtained by an average calculation of $Sm \cdot \Delta x = \Sigma \Delta vi/n$. When the intervals of the sampling points at step (a) and (b) have a particular deviation, the differences $\Delta vi$ are weighted corresponding to the deviation of the sampling intervals in the average calculation.

A second aspect of the present invention is a self-calibration method for a sensor whose calibration curve is expressed by $f(x)=v=Sm \cdot x+g(x)$, where x represents an input value, v represents an output value, Sm represents an average sensitivity, and g(x) represents a linearity error, the method comprising the steps of: (a) representing the calibration curve with an inverse function of $B(v)=x=v/Sm+T(v)$; (b) sampling output values vi (where i=1, 2, ..., n) at a plurality of first sampling points in a predetermined calibration range of the sensor, (c) sampling output values $vi_+$ at a plurality of second sampling points in the predetermined calibration range of the sensor, input interval between each of the first and second sampling points being $\Delta x$; (d) calculating a derivative $T'(vi) \approx \Delta x/\Delta vi - 1/Sm$ of a linearity error T(v) of the inverse function B(v) using difference $\Delta vi = vi_+ - vi$; and (e) numerically integrating the derivative T'(vi) so as to obtain the linearity error T(v).

According to the present invention, without need to use both a high accuracy reference sensor against an object sensor and other additional apparatus, by processing the samples data (namely, approximate calculations of derivative of the linearity error using difference values, approximate calculation of the linearity error using the derivative, and convergence calculations of improving processes of sampling points and linearity error), the linearity error can be self-calibrated. Consequently, according to the present invention, a sensor mounted in a unit can be calibrated by itself in situ condition without need to use a special space and additional units.

In addition, according to the present invention, with the inverse function of the calibration curve, the derivative of the linearity error function of the inverse function is directly obtained from the samples data, and numerical integrating is performed on the resultant, whereby the calibration curve can be obtained. In the method using the inverse function, since approximate calculations are not used in the assumption that there is no linearity error, a calibration curve can be obtained without need to perform convergence calculation.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 2:
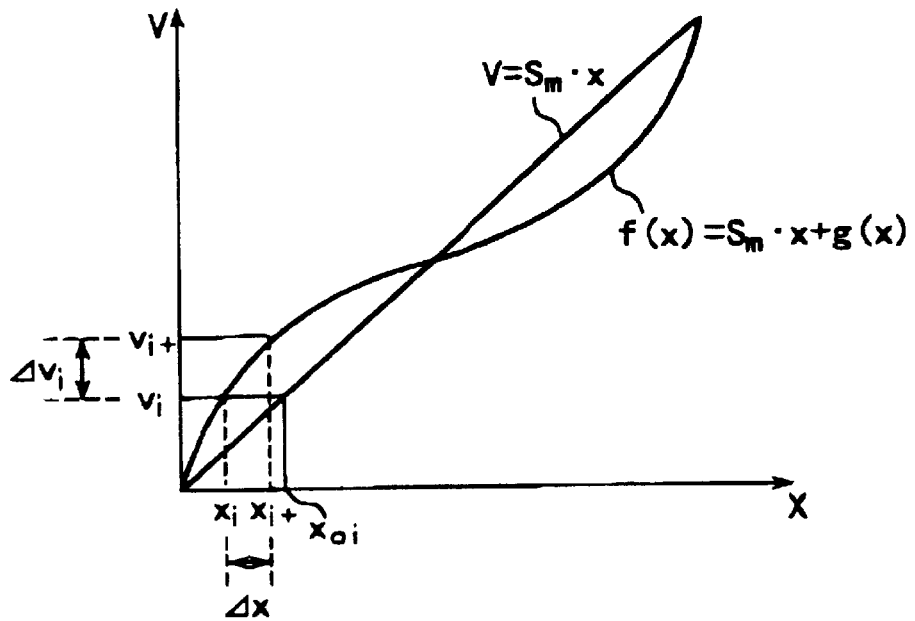
FIG. 2 is a graph for explaining a difference value calculation and an input approximate value calculation on a calibration curve.

FIG. 2 shows the relation between input values and output values of a metrological sensor (namely, a calibration curve). In most cases, it is assured that the deviation to a straight line that represents an average sensitivity (referred to as calibration straight line) is in the range of ±a % of the output values. Assuming that an input value of the sensor (the input value is a displacement in the case of a displacement sensor) and an output value thereof are donated by x and v, respectively, a function v=f(x) of the calibration curve is represented by a straight line whose slope is an average sensitivity Sm and a linearity error $g(x)$ that represents the deviation from the straight line as the following equation (1).

$$v=f(x)=Sm \cdot x+g(x) \qquad (1)$$

Figure 1:
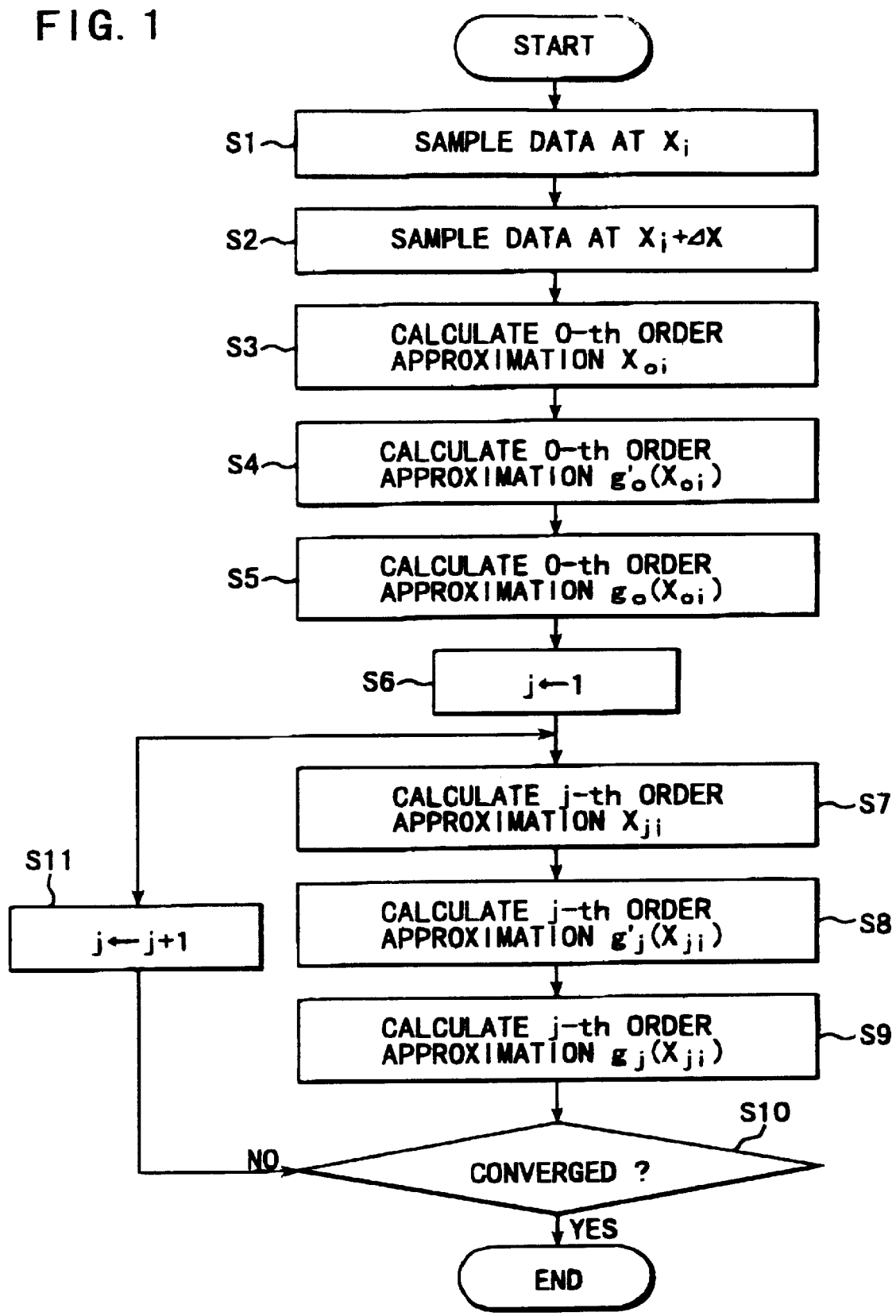
FIG. 1 is a flow chart showing a self-calibrating process for a displacement sensor according to the present invention.

In this embodiment, it is assumed that the sensor to be calibrated is a displacement sensor that is a kind of a metrological sensor. In this embodiment, using output values of a plurality of first sampling points in a predetermined calibration range of the object displacement sensor and output values of a plurality of second sampling points that are slightly varied against the first sampling points, a linearity error of the object sensor is calibrated by numerical calculation for digitized data. FIG. 1 is a flow chart showing the self-calibration process.

As shown in FIG. 1, displacements (in other words, input values) are applied to the displacement sensor at predetermined intervals in a predetermined calibration range and output values are sampled (at step S1). It is preferable to place the sampling points xi (where i=1, 2, ..., n) at equal intervals in the calibration range. However, the intervals may not be necessarily uniform strictly.

Next, the output values are sampled at the second sampling points $xi_+ = xi + \Delta x$, where the small input displacement $\Delta x$ is added to each first sampling point xi at step S1 (at step S2). The small input displacement $\Delta x$ may be provided as a known value. However, in reality, as will be described later, the small input displacement $\Delta x$ is obtained by averaging calculation for the output values.

With the data obtained by the two sampling operations, assuming that the output values at the sampling points xi are denoted by vi and that the linearity error $g(x)$ is ignored, the input approximation (i.e., the 0-th order input approximation) x0i are calculated based on the following expression (2) (at step S3).

$$x0i \approx vi/Sm \qquad (2)$$

On the other hand, when the output values at the sampling point $xi_+$ obtained at step S2 are denoted by $vi_+$, the difference $\Delta vi$ of the values of sampling points xi and $xi_+$ that are apart by $\Delta x$ are obtained based of the following equation (3).

$$vi = vi_+ - vi \qquad (3)$$

With the obtained difference values $\Delta vi$, the 0-th approximation g'0(x0i) of the derivative function of the linearity errors g(x) are obtained by numeric calculations based on the following expression (4) (at step S4).

$$g'0(x0i) = \Delta g(x)/\Delta x \approx \Delta vi/\Delta x - Sm \qquad (4)$$

Figure 3:
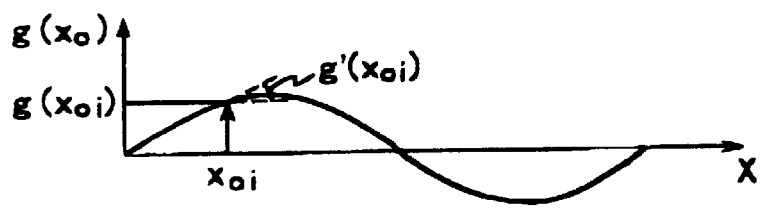
FIG. 3 is a graph for explaining an approximate value calculation of a derived function of a linearity error.

As shown in FIG. 3, the derivative approximation g'0(x0i) represent the inclination of the linearity errors g(x) at x0i. Next, the derivative approximation g'0 (x0i) are numerically integrated, whereby the 0-th order approximation $g0(x) = \Sigma g'0(x0i)\Delta x$ of the linearity error g(x) are obtained (at step S5).

Figure 4:
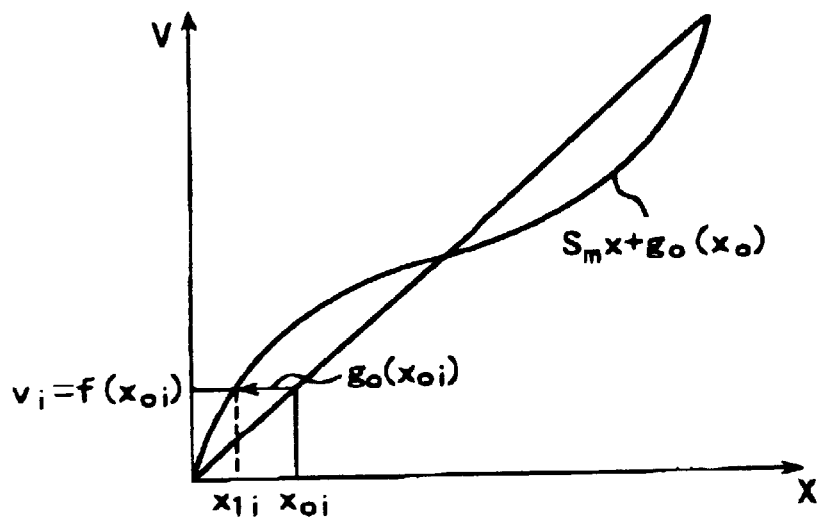
FIG. 4 is a graph for explaining an approximate value calculation of a linearity error.

The improving process time j is initialized (at step S6). Using the 0-th order linearity error approximation g0(x) obtained at step S5, convergence calculation for converging the linearity errors g(x) in a predetermined range are repeatedly performed. In details, with the 0-th order linearity error approximation g0(x), the 0-th order input approximation x0i at the sampling points xi are improved, whereby the primary input approximation x1i are obtained (at step S7). As shown in FIG. 4 when the 0-th order input approximation x0i are corrected using g0(x), the primary input approximation x1i can be given as the following equation (5).

$$x1i = \{vi - g0(x0i)\}/Sm \qquad (5)$$

Next, using the primary input approximation x1i, primary derivative approximation g'1(x1i) are calculated based on the expression (4) (at step S8). That is, the 0-th order derivative approximation g'(x0i) are improved to be the primary derivative approximation g'1(x1i). The obtained primary derivative approximation g'1(x1i) are numerically integrated, whereby primary linearity error approximation g1(x1i) are calculated (at step S8). Thereafter, it is determined whether or not for example residual errors are converged in the predetermined range (at step S10). When the converging condition is not satisfied, the improving process time j is incremented by 1 (at sept S11). Thereafter, the same improving process is repeated. Thus, the approximate accuracy of the derivative g'(x) and the linearity error g(x) can be improved.

Generally, the derivative g'j(xji) represented by the j-th input approximation xji and the linearity error gj(xji) that is obtained by integrating g'j(xji) are represented as follows.

$$g'j(xji) \approx \Delta vi/\Delta x - Sm \quad gj(xji) = \int g'j(xji)dx \qquad (6)$$

Using the expression (6), (j+1)-th input approximation xj+1i that is improved of the j-th input approximation xji can be obtained as the following expression (7).

$$xj+1i = \{vi - gi(xji)\}/Sm \qquad (7)$$

When the improving process time j is incremented by 1, the approximate degree of the input xi and the linearity error g(x) can be gradually improved and accurately converged to a calibration curve.

Generally, the relation between the average sensitivity Sm and the small input variation $\Delta x$ is given by the following equation (8)

$$Sm \cdot \Delta x = \Sigma \Delta vi/n \qquad (8)$$

Figure 5:
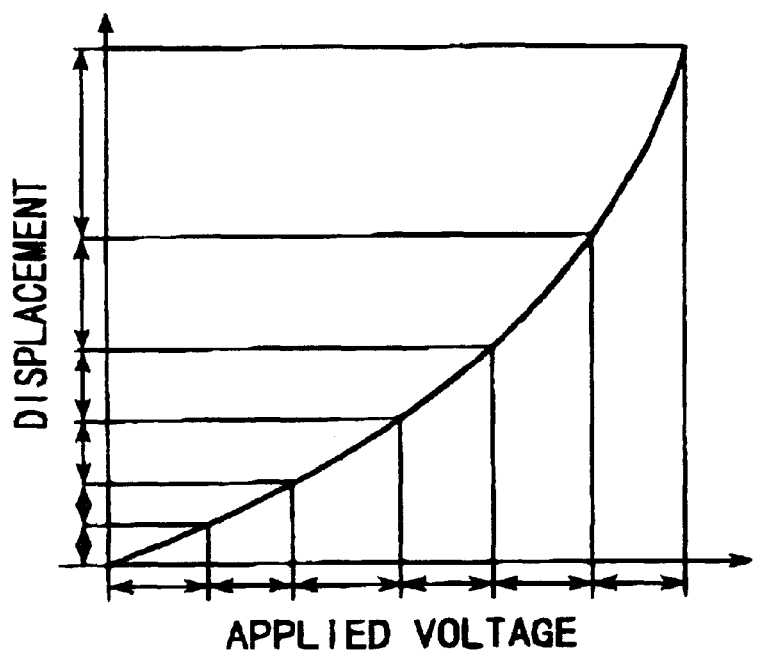
FIG. 5 is a graph showing characteristics of a drive piezo-electric device.

Thus, when one of Sm and $\Delta x$ is accurately known, the other can be obtained by calculations. For example, when the average sensitivity Sm is accurately known, the small input variation $\Delta x$ can be precisely obtained corresponding to the expression (8). With the obtained small input variation $\Delta x$, calculations of the expression (4) and the successive expressions can be performed. At this point, sampling points xi are preferably placed at equal intervals (not at strictly equal intervals). When the sampling points xi do not vary at equal intervals along with i, but deviate, the right side of the expression (8) does not give a correct average value. For example, when a displacement sensor is calibrated with displacement of a piezo-electric device such as PZT, the displacement output values corresponding to input voltages at equal intervals of the piezo-electric device become at unequal intervals as shown in FIG. 5. Since the displacement output values at unequal intervals shown in FIG. 5 become input values of the sensor to be calibrated, sampling points xi become at unequal intervals. In this case, when $\Delta x$ is obtained by the averaging process given by the expression (8), the weight varies corresponding to xi in the measurement range. Thus, $\Delta x$ cannot be accurately obtained.

In this case, as given by the following expression (9), in the average calculations, $\Delta vi$ should be weighted corresponding to the sampling intervals.

$$Sm \cdot \Delta x = \Sigma (xi+1-xi)\Delta vi/(xn-x1) \qquad (9)$$

In the present invention, depending on the number of cycles of the linearity error in the calibration range Mr, the error of the numeric calculations varies. In other words, when the derivative function is approximated with numeric calculations and the result is numerically integrated with a formula of middle point, the ratio of the true value to the approximate value can be evaluated as a transfer function given as the following expression (10).

$$H(f) = xs \cdot \sin(2\pi f \Delta x/2)/\{\Delta x \cdot \sin(2\pi fxs/2)\} \qquad (10)$$

where xs represents sampling intervals; and f represent the frequency of the calibration curve.

Figure 6:
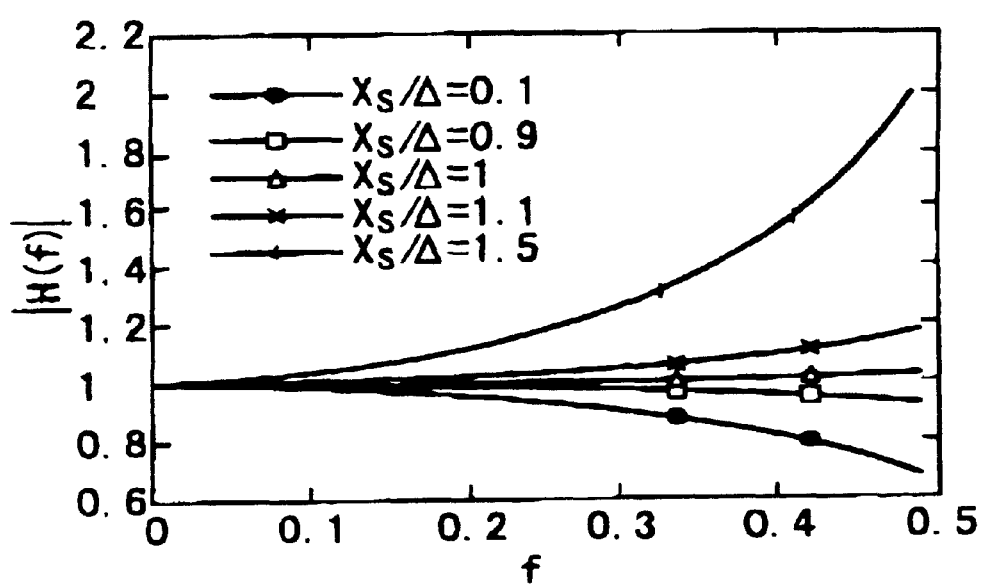
FIG. 6 is a graph showing transfer functions of approximate errors with numeric calculations.

Assuming that the sampling interval xs is a basic length and the frequency f is non-dimensional, because of sampling theorem, it is necessary to consider the range of $f \leq 0.5$. FIG. 6 shows the frequency dependency of the absolute value of the above-defined transfer function by use of $\alpha = xs/\Delta x$ as a parameter. FIG. 6 shows that when the wavelength is 10 times or more of the sampling intervals xs (i.e., $f \leq 0.1$), even if the parameter is varied, a large error does not take place. Even if the wavelength is around three times of the sampling intervals xs (i.e., f=0.3), when $0.9 \leq \alpha \leq 1.1$, the calculation error is 10% or less of the true value.

Simulations and experiments that follow have been performed in the condition that $\alpha = 1$.

Accidental errors included in sampled read values cannot be separated from correct read values. Thus, the accidental errors remains in the calibration result. Assuming that the accidental errors of the read values are denoted by $\sigma m$, in the difference $\Delta v$ of the read values, the accidental error becomes $\sqrt{2}\sigma m$ due to the propagation raw. This value is equivalent to the case that, in a conventional comparison calibration, the error of the reference side is the same as the error of the object side.

The error $\sigma \Delta$ that is included when the small displacement $\Delta x$ is estimated can be given as the following expression (11).

$$(\sigma \Delta/\sigma m)^2 = 2/(NSm) \qquad (11)$$

The influence of the error $\sigma \Delta$ becomes an amplitude error of the linearity error g(x) through the evaluation error of the derivative function g(x). Additionally, on the i-th sampling point, at which the linearity error g(x) is obtained by a numerical integration, the error σgi due to the error propagation raw is generated as the following expression (12).

$$(\sigma gi/\sigma m)^2 = 2i \qquad (12)$$

However, depending on how the sensitivity Sm is given (namely, whether the sensitivity Sm is given as the average value of the slope of the calibration curve or the straight line that connects both ends), the average value becomes zero or both the ends become zero as the form of the error function Δg(x).

According to the present invention, as is clear from the above-described calibration theory, the deviation of the accidental error from the equal intervals of the sampling points xi does not cause a serious calibration error factor. In addition, the deviation does not cause the evaluation of Δx given by the expression (8) to largely vary.

It is difficult to determine whether the cause of the deviation of the small input displacement Δx is the difference of the measured point of $vi_+$ or the accidental error of $vi_+$. Thus, the accidental error of σm may take place due to the fluctuation of Δx.

Factors that may affect the accuracy of the self-calibration method according to the present invention are, for example, (1) the amplitude ag and the frequency fg (the frequency represented by the number of waves in the full calibration range of the sensor) of the linearity error g(x) corresponding to the displacement, (2) the sampling intervals xs and the small input displacement Δx, (3) the maximum value rs of the truncation error due to the quantization of the sensor output values (the maximum value rs is referred to as sensor resolution), (4) the accidental error σm affected by the noise level of the output signal of the sensor, (5) the deviation of the equal intervals of the sampling points xi, and (6) the accidental error value xie included in xi.

In a simulation of the displacement sensor that the inventors of the present invention made, with parameter values as listed in Table 1, the influences of amplitudes and frequencies were examined.

Table 1

Measurement range Mr: 10 μm

Sampling intervals xs: 2 μm small displacement Δx: 2 μm

Accidental error σm: Sensor resolution rs is multiplied by random numbers (width of ±1) generated by a computer (width of ±1)

Accidental error xie: A constant cx is multiplied by random numbers generated by a computer The amplitude ag of g(x) will be shown as converted into a displacement.

Figure 7:
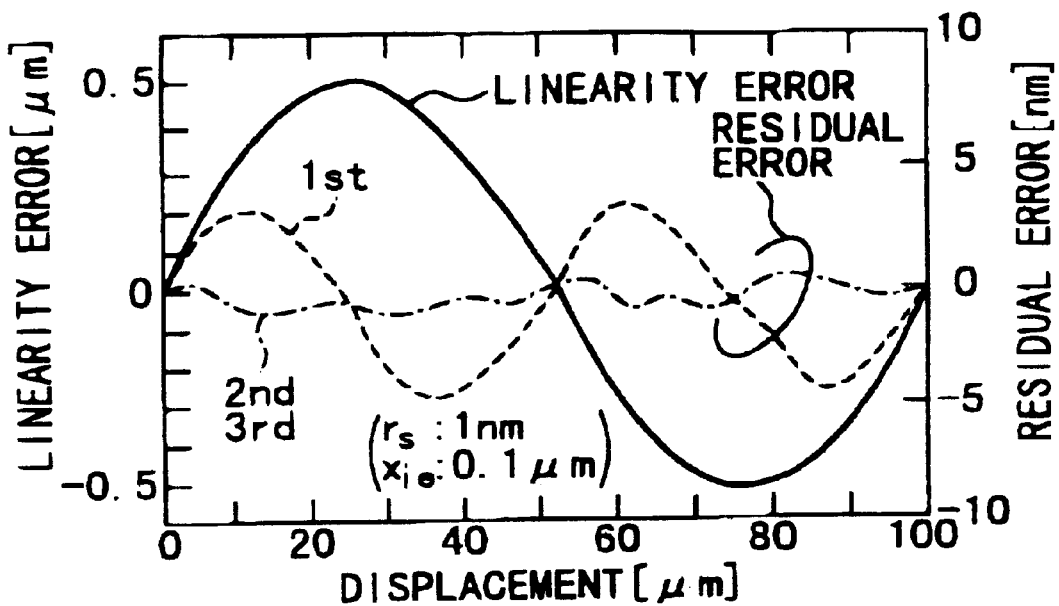
FIG. 7 is a graph showing linearity errors and residual errors of calibration results.

FIG. 7 shows a calibration example of a displacement sensor with a linearity error of which the measurement range Mr is one period. FIG. 7 shows a finally calibrated linearity error (solid line) and residual errors thereto. In the third or later correction calculation, the residual error does not almost vary. The maximum value of the peak-to-peak residual error is around 2 nm or less.

Figure 8:
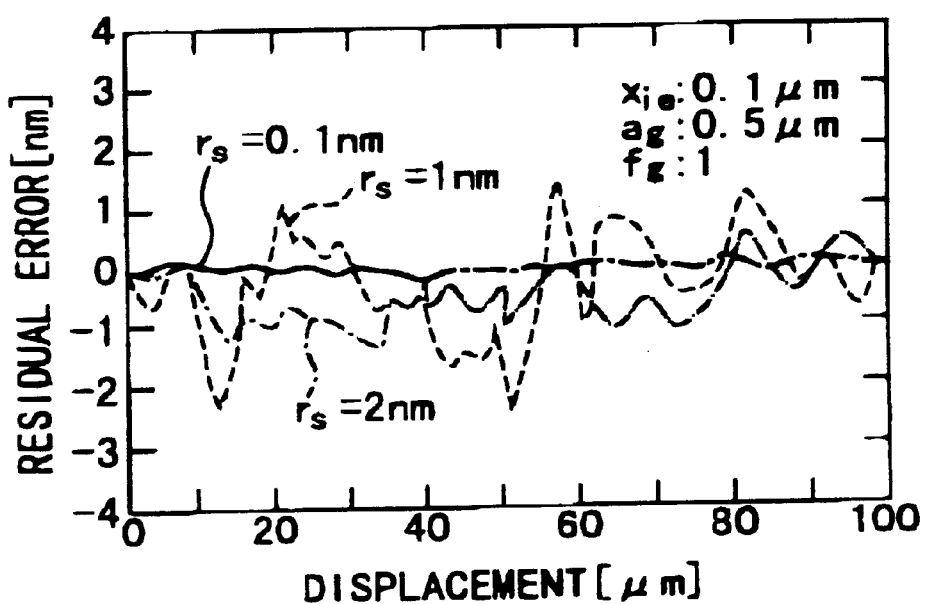
FIG. 8 is a graph showing calibration results in the case that there are accidental errors.

FIG. 8 shows the variation of the residual error in the case that only the accidental error σm is varied with a parameter of the sensor resolution rs in the same condition as FIG. 7. FIG. 8 shows that the peak-to-peak residual error is 2rs or less.

Figure 9:
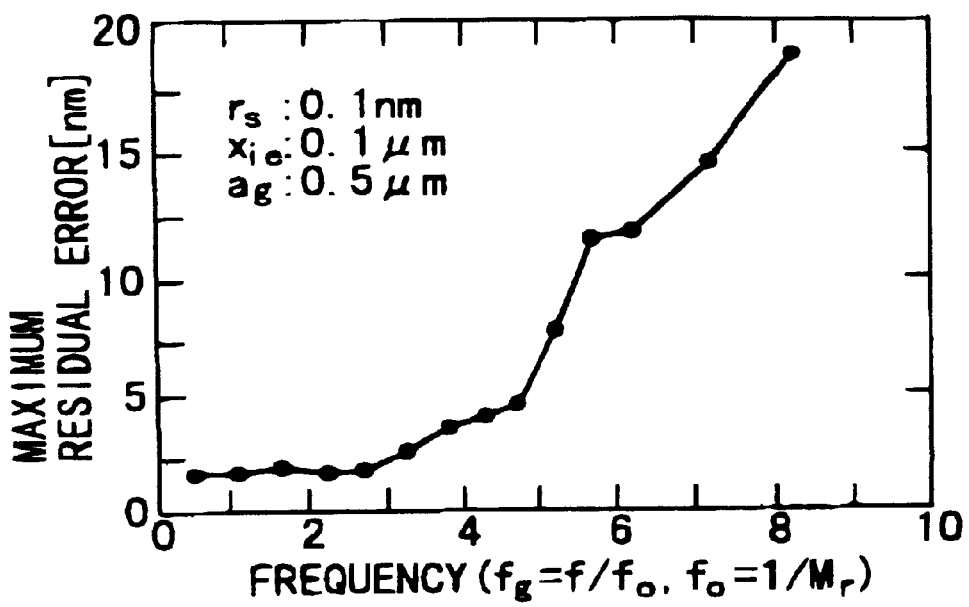
FIG. 9 is a graph showing the relation between a linearity error frequency and a calibrated residual error.

FIG. 9 shows the maximum residual error in the case that the frequency fg (=f/f0, f0=1 /Mr) of a given linearity error is varied. When the linearity error has three cycles or less in the full calibration range Mr (fg=3), the residual error does not almost depend on the frequency. As the frequency exceeds this condition, the residual error remarkably increases. This means that as long as the integration method according to the present invention is used, the error given by the expression (10) takes place. In other words, when a calibration curve has a high frequency, it is necessary to decrease the sampling intervals or perform a compensation considering the expression (10).

Figure 10:
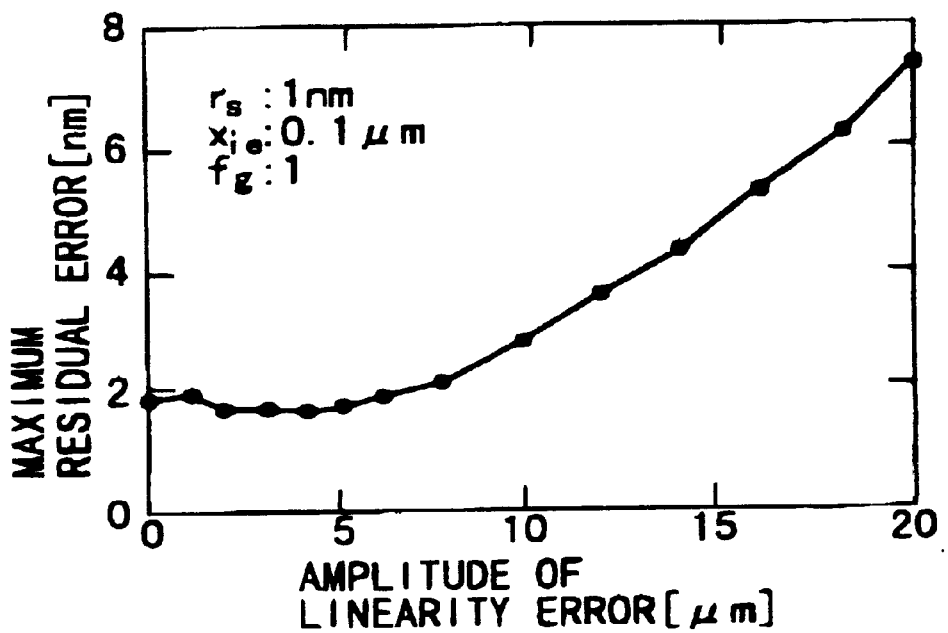
FIG. 10 is a graph showing the relation between a linearity error amplitude and a residual error.

FIG. 10 shows the amplitude of linearity error and the maximum residual error on the X axis and the Y axis, respectively. When the amplitude of linearity error is 6 μm (6% of the measurement range Mr) or less, the residual error is two times or less of the resolution. When the amplitude exceeds 6 μm, the residual error gradually increases. However, when the amplitude is 20% of the measurement range, the residual error is around $4 \times 10^{-4}$. In other words, according to the method of the present invention, a highly accurate calibration curve can be obtained against the linearity error in the range of the conventional sensor.

Figure 11:
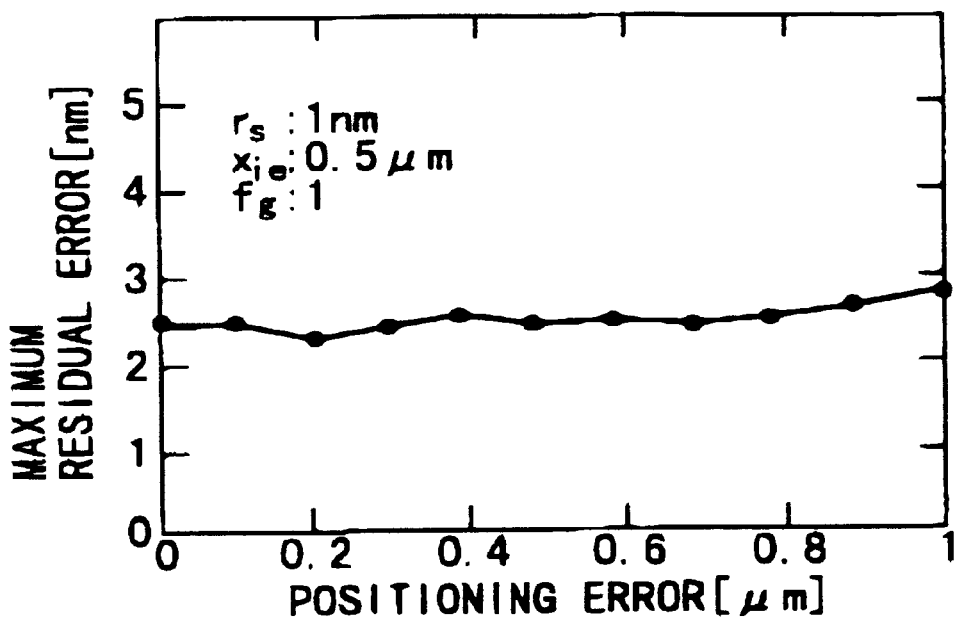
FIG. 11 is a graph showing the relation between a position error and a residual error.

FIG. 11 shows the maximum residual error in the case that the value of the accidental error included in a sampling point xi is varied. FIG. 11 shows that the maximum residual error is not almost affected by the alignment error of the sampling point xi. Even if the alignment error amounts to the half of the sampling intervals (1 μm), the residual error does not almost increase. It represents that the method of the present invention can sufficiently deal with the input fluctuation at random. Even if the space frequency of the linearity error increases, the influence of the random fluctuation of xi does not remarkably increase. It represents that since the method of the present invention does not require equal intervals of input values, the influence of other than output error fluctuation is not large.

Figure 12:
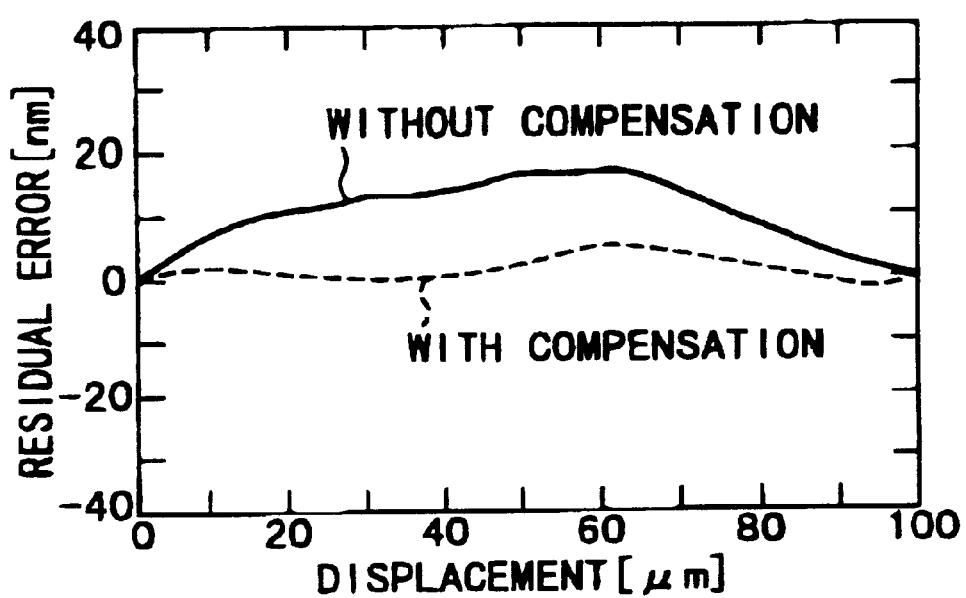
FIG. 12 is a graph showing the relation between the presence/absence of a compensation of a deviation of sampling intervals and a residual error.
Figure 13:
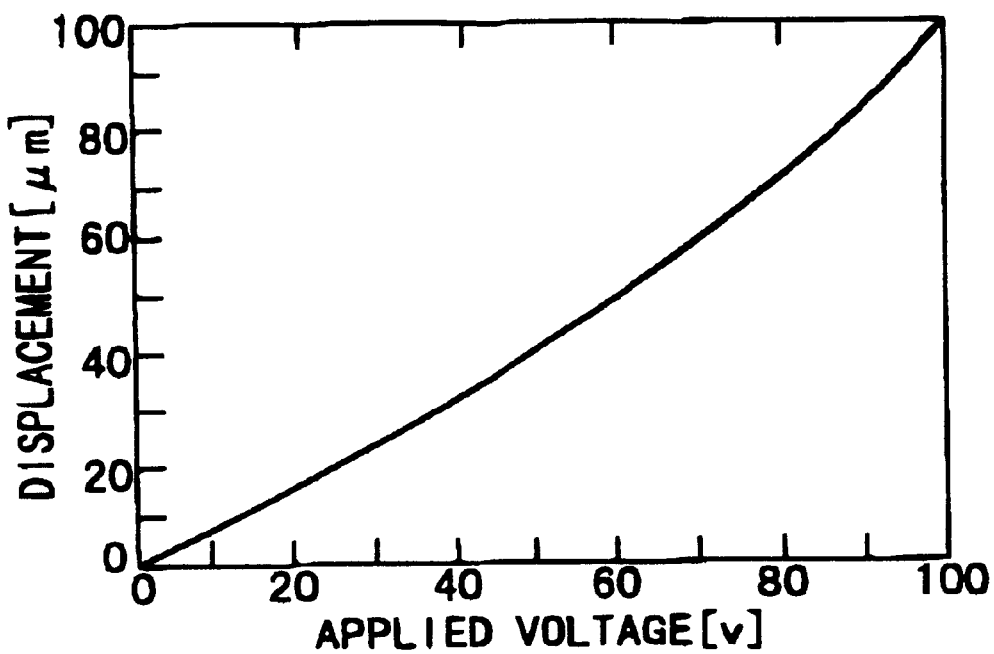
FIG. 13 is a graph showing the relation between a drive voltage and an input displacement.

FIG. 12 shows calibration results of which the intervals of sampling points xi deviate due to the hysteresis of a drive piezo-electric device used for a calibration of a displacement sensor in the case that the influence of the deviation is compensated and in the case that it is not compensated. In other words, the residual error in the case that the small displacement Δx is obtained by the average calculation given by the expression (8) (namely, the compensation is performed) is obtained. In addition, the residual error in the case that the small displacement Δx is obtained by a weighted average calculation given by the expression (9) (namely, the compensation is performed) is obtained. FIG. 13 shows the relation between an applied voltage of the piezo-electric device and the output displacement (i.e., the input displacement given to a displacement sensor to be calibrated) in the calibration convergence calculation. As shown in FIG. 12, it is appreciated that when the deviation of the small displacement Δx used in the convergence calculation is compensated, the residual error becomes small.

Figure 14:
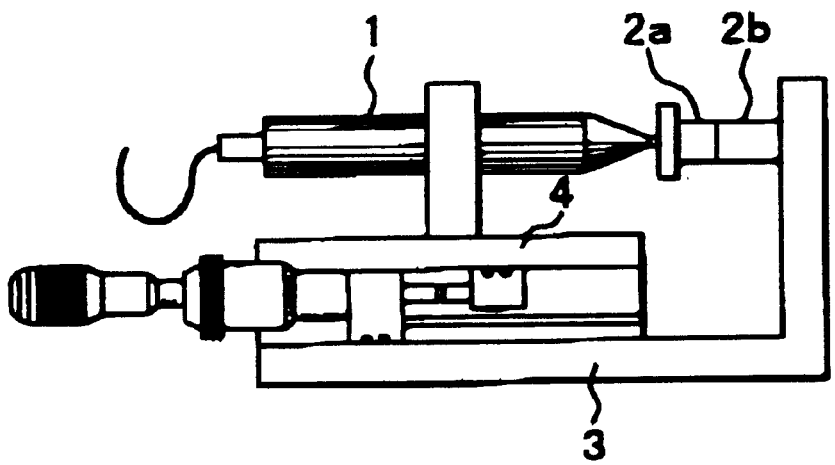
FIG. 14 is a schematic diagram showing an experimental calibration unit.

FIG. 14 shows a calibrating unit for a displacement sensor used in an experiment. A capacitance type displacement sensor 1 to be calculated is supported on a table 4 that is slidably disposed on a specimen table 3. Two piezo-electric devices (PZT) 2a and 2b that are connected in series are secured to the specimen table 3 so as to supply the input displacement and the small displacement. The piezo-electric device 2b is adapted to supply the small displacement Δx. First, the piezo-electric device 2a is expanded and shrunk in the calibration range (=10 μm). Thus, the output values of the displacement sensor 1 are obtained at intervals of 0.2 μm (as the first sampling operation). Next, in the state that an small displacement is applied by the piezo-electric device 2b for Δx=0.2 μm, the piezo-electric device 2a is expanded and shrunk.

Thus, the output values are measured (as the second sampling operation). It took around 15 minutes for the reciprocal operations in the calibration range of the table because the piezo-electric device 2a should be stabilized at each sampling point.

Figure 15:
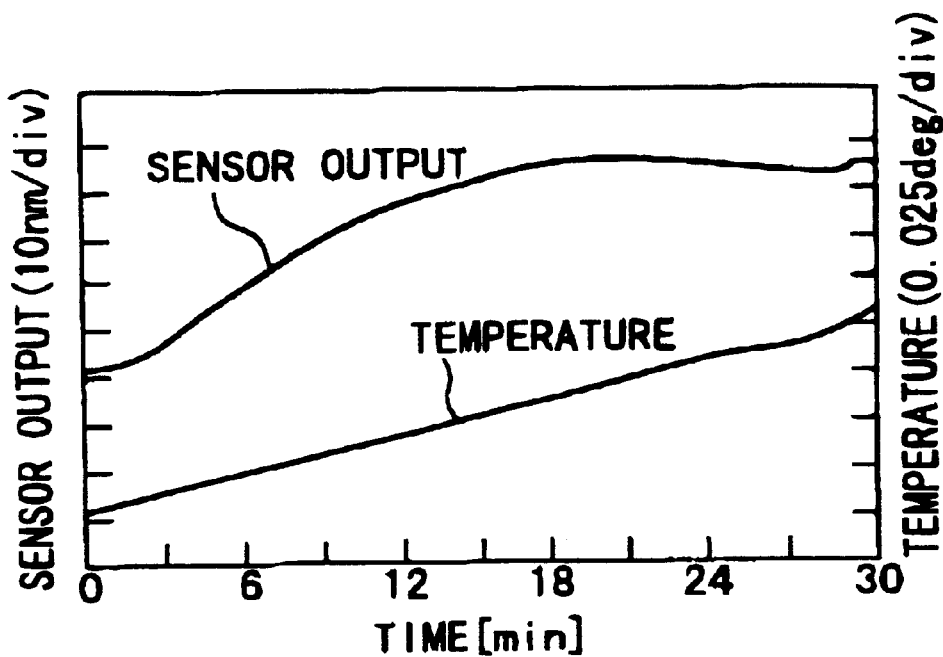
FIG. 15 is a graph showing the stability of the calibration unit shown in FIG. 14.

FIG. 15 shows the stability of the system in 30 minutes in which the piezo-electric device 2a is expanded and shrunk two times.

Figure 16:
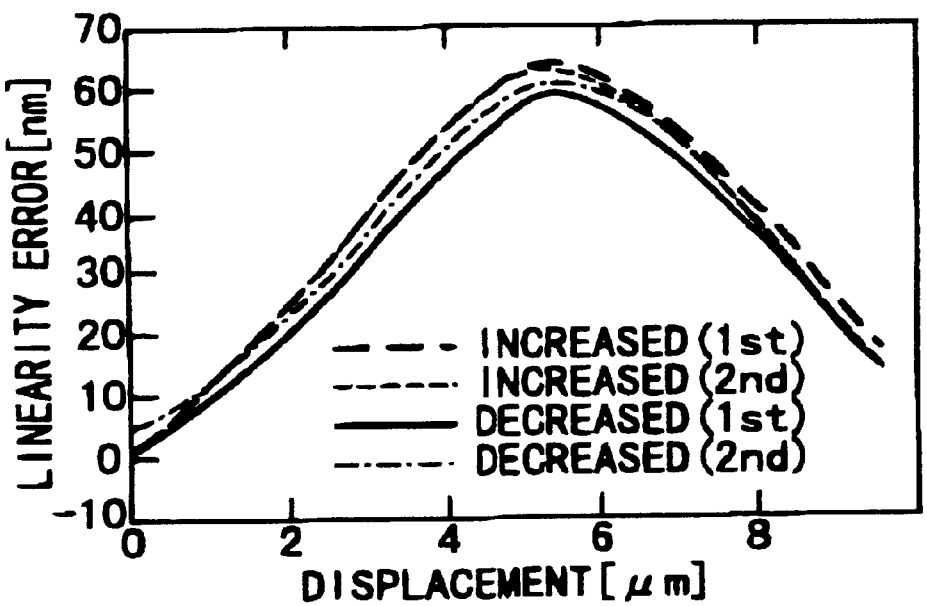
FIG. 16 is a graph showing the calibration results of the calibration unit shown in FIG. 14.

FIG. 16 shows four calibration results each of which is calibrated in situ condition for two times expanding and shrinking of the piezo-electric device 2a. The four calibration results have errors of up to 8 nm. The four calibration results are in the repetitive errors evaluated from the stability of the system shown in FIG. 15.

Figure 17:
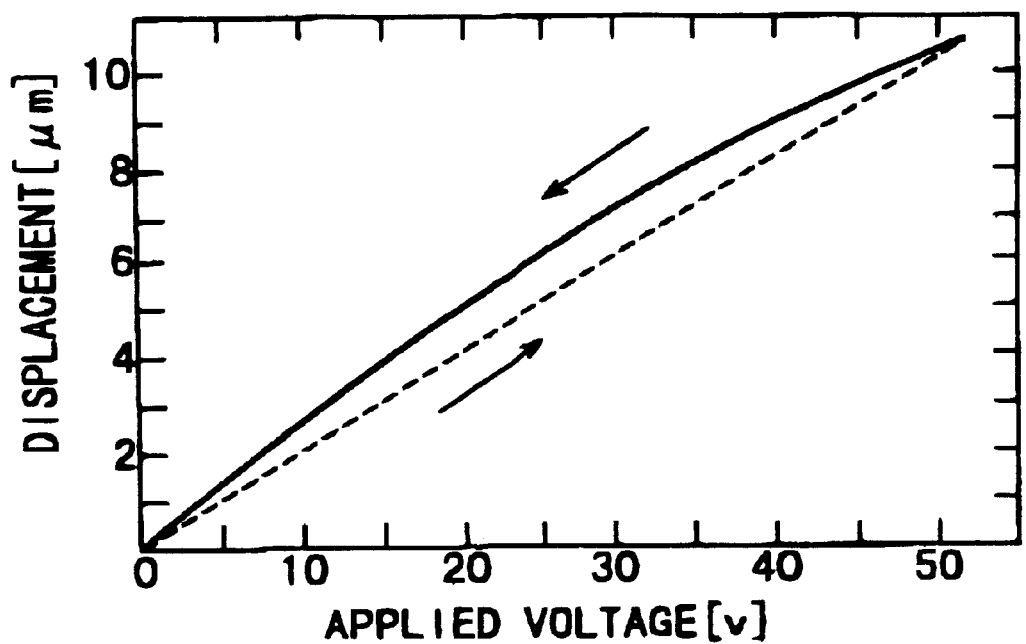
FIG. 17 is a graph showing the relation between a drive voltage and an input displacement of the calibration unit shown in FIG. 14.

FIG. 17 shows the relation between the displacement of the last calibration result and the drive voltage of the piezo-electric device 2a. As shown in FIG. 17, a hysteresis loop of the piezo-electric device 2a is appeared in an appropriate state.

Figure 18:
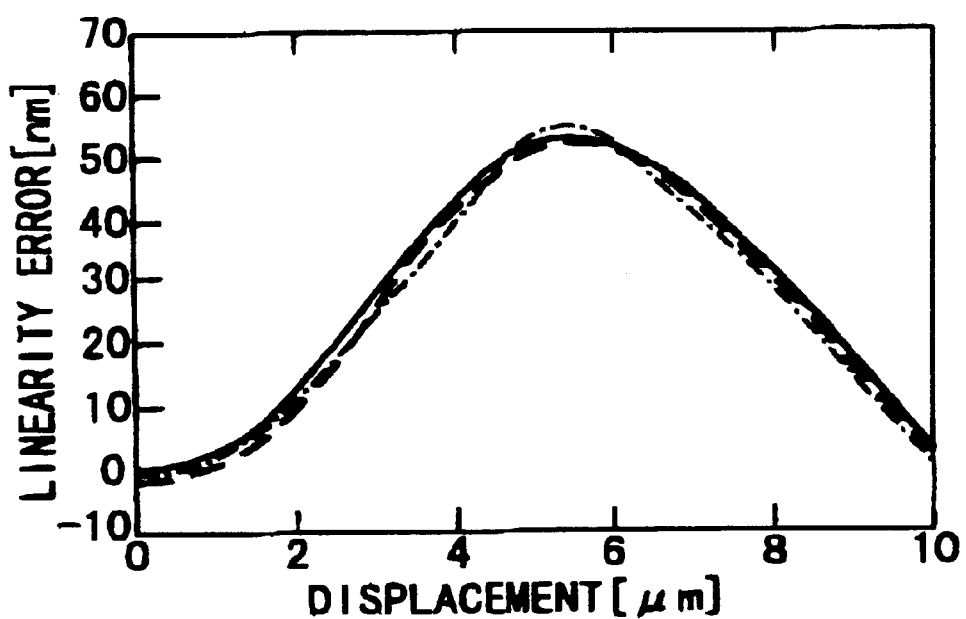
FIG. 18 is a graph showing calibration data obtained by the self-calibration method according to a related art reference.

FIG. 18 shows four calibration results in the self-calibration method using two sensors and a lever system according to the related art reference that the inventor of the present invention have proposed. As shown in FIG. 18, it is clear that the repetitive error is up to 10 nm.

Figure 19:
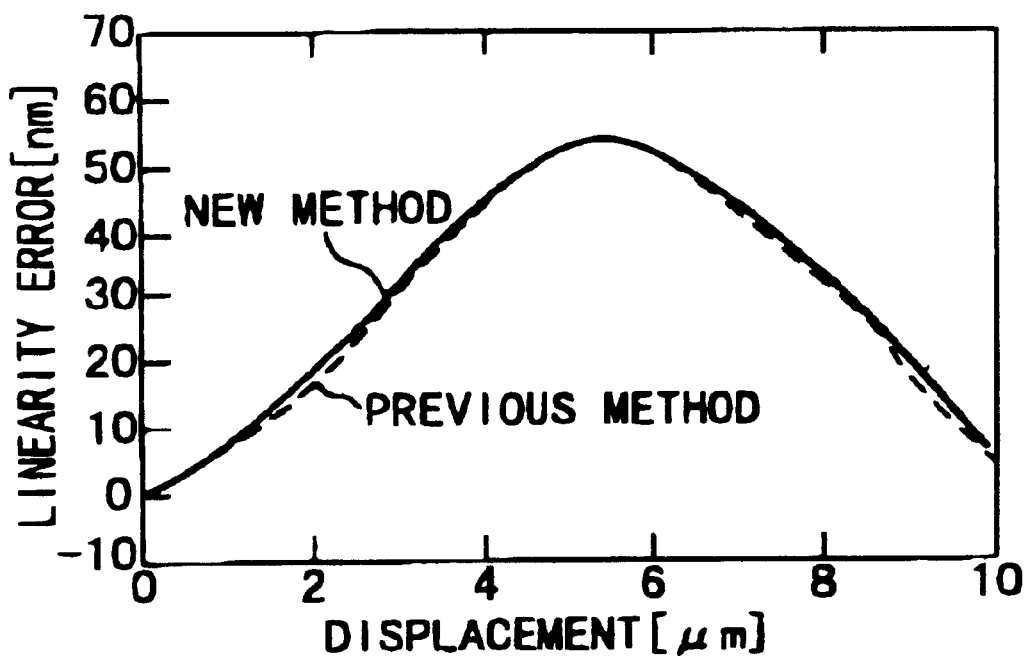
FIG. 19 is a graph showing curves that represent the averages of those shown in FIGS. 16 and 18.

FIG. 19 shows the average value of the calibration results shown in FIG. 16 of the method according to the present invention and the average value of the calibration results shown in FIG. 18. The differences between the linearity errors of both the methods is up to around 2 nm. The calibration results have a reproducibility with an error of around 0.2% in the calibration range, this value is very small against when the repetitive errors of both the methods are considered, it represents high reliability of these methods.

Next, several examples of in situ calibration of an interference microscope that is a metrological sensor and real data thereof will be described.

Figure 20:
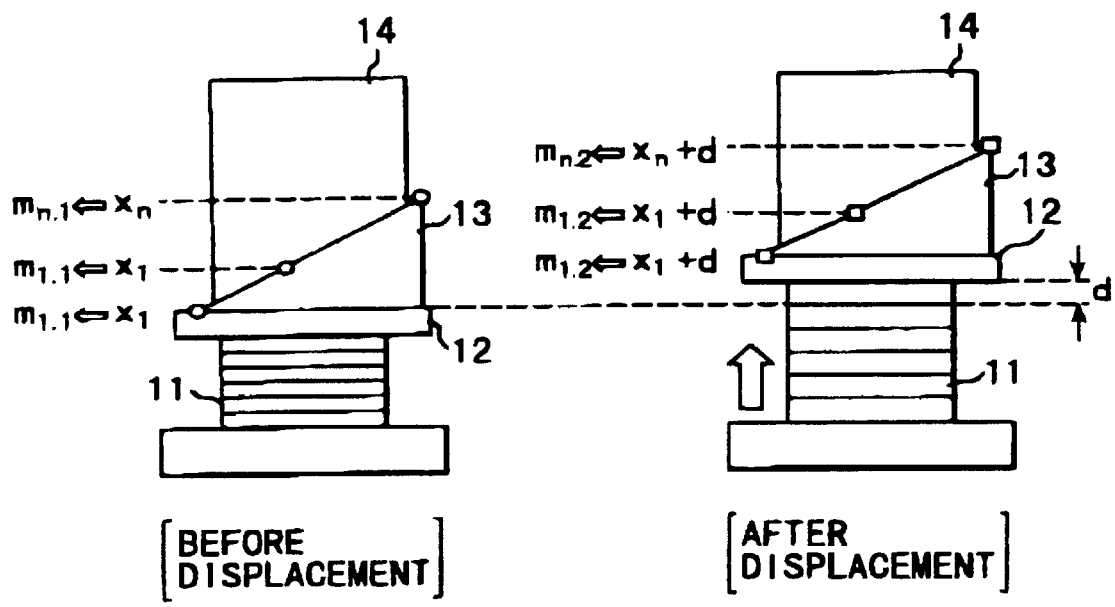
FIG. 20 is a schematic diagram showing an application of the present invention to an interference microscope.

FIG. 20 shows a method for calibrating the deviation to a straight line of displacement measured values in an interference microscope that measures the surface displacement in the direction of height with a combination of interference fringes of white light and the displacements of a piezo-electric device. An object specimen 13 is disposed on a specimen table 12. An interference light beam 14 is radiated to the object specimen 13. The specimen table is slightly displaced with a piezo-electric device 11 such as a PZT in the direction of height. The object specimen 13 has an inclined surface that allows the surface on which the light beam 14 is radiated to be displaced for a required length (height) as a calibration range. Using the object specimen 13, in the state that the height of the specimen 13 is fixed, a plurality of output values in the calibration range can be obtained. The piezo-electric device 11 of the specimen table 12 is expanded by $\Delta x$ (as shown by d in FIG. 20) and the height of the specimen table 12 is measured twice. The difference of height of the specimen table 12 before it has not been displaced and after become the difference $\{g(x+\Delta x)-g(x)\}$ of linearity error functions of displacements in the direction of height of the microscope. The 0-th order approximate value of the input displacement x is obtained by the read value of the height.

Figure 21:
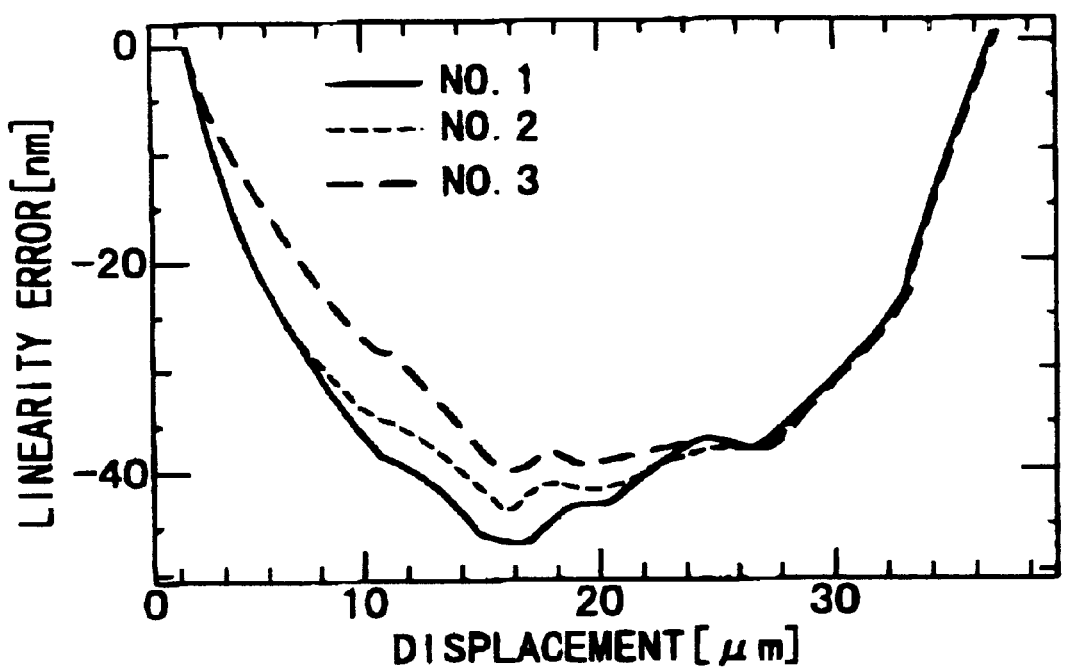
FIG. 21 is a graph showing linearity error characteristics of the application shown in FIG. 20.

FIG. 21 shows calibration curves (No. 1 to No. 3) measured by the system shown in FIG. 20 in the method corresponding to the present invention. It is clear that the three calibration curves are almost coincident and with the calibration data, the measurement accuracy of height on the order of 1 $\mu$m is improved by around one digit.

Figure 22:
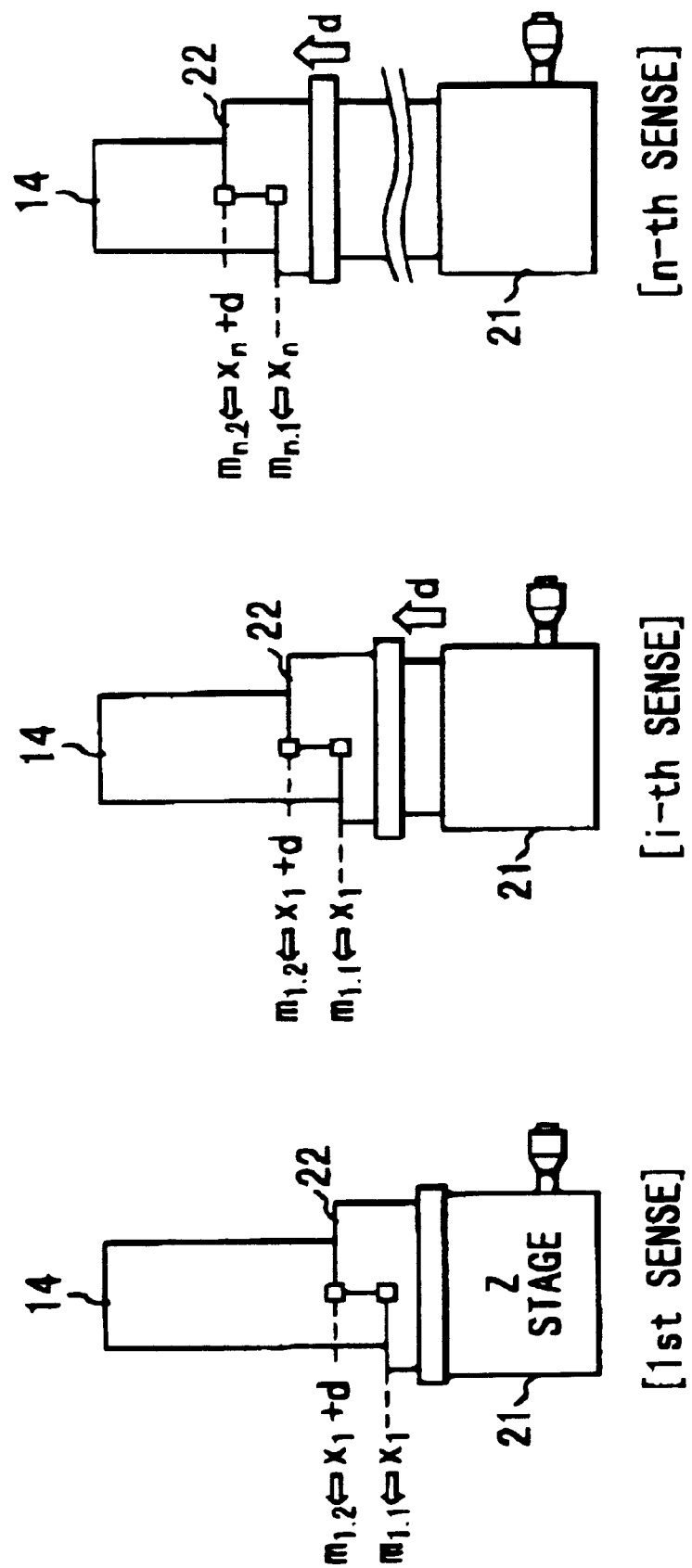
FIG. 22 is a graph showing another application of the present invention to an interference microscope.

FIG. 22 shows another example which the present invention is applied to a calibration of an interference microscope.

In this example, a calibration specimen 22 to which an interference light beam 14 is radiated has a step of $\Delta x$ in the direction of height. The light beam 14 is radiated on the stepped surface of the calibration specimen 22. While the specimen 22 is varied and positioned in a predetermined calibration height (i.e., input value x is varied) with the x-axis stage 21, measurement operations are repeated. In this sequential measurement, two data sampling are substantially performed because of the surface step of $\Delta x$. Thus, with the higher surface and the lower surface, the difference of linearity errors $g(x+\Delta x)-g(x)$ can be obtained.

Figure 23:
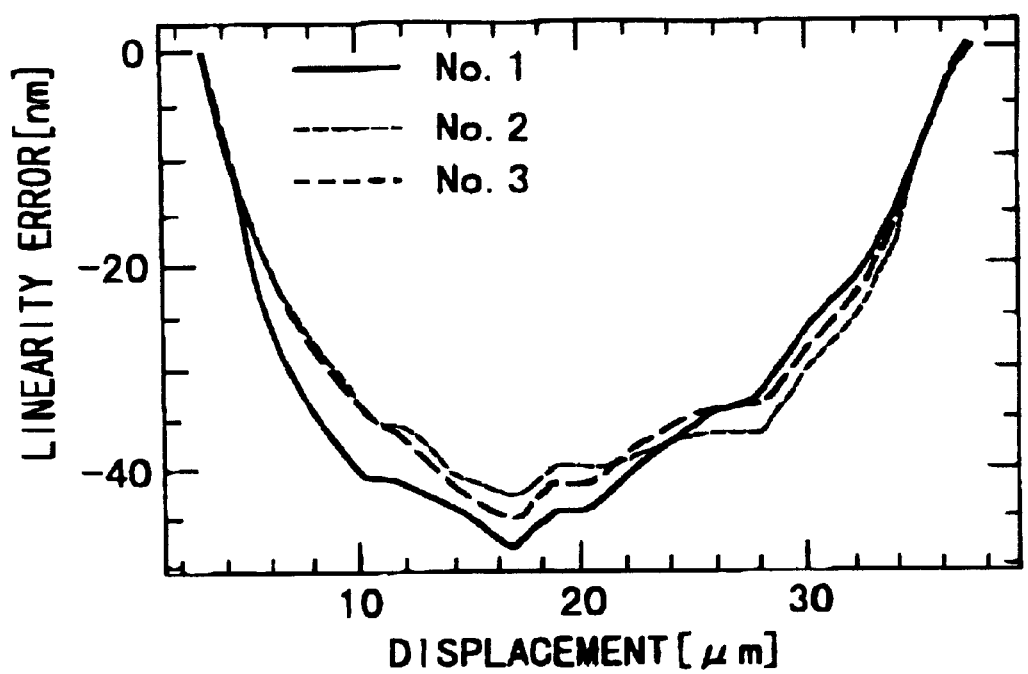
FIG. 23 is a graph showing linearity error characteristics of the application shown in FIG. 20.

FIG. 23 shows calibration curves No. 1 to No. 3 obtained with the system shown in FIG. 22 in the method according to the present invention. The calibration curves No. 1 No. 3 shown in FIG. 23 well match in comparison with those shown in FIG. 21. Thus, it is clear that the method according to the present invention has a high reliability.

Figure 24A:
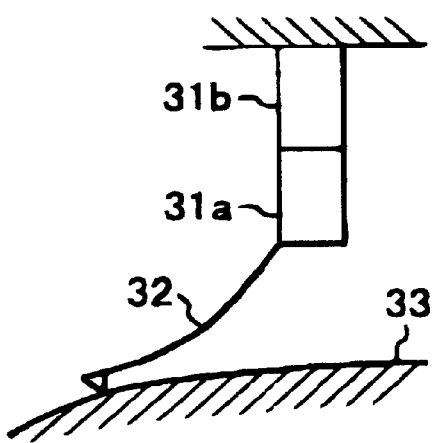
FIGS. 24A and 24B are schematic diagrams showing an application of the present invention to a scanning type probe microscope.
Figure 24B:
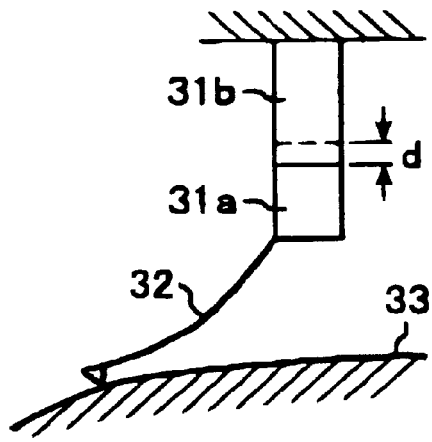

FIGS. 24A and 24B show an example which the present invention is applied to a calibration of a scanning type probe microscope. Referring to FIGS. 24A and 24B, a piezo-electric device 31a is connected in series to a follower piezo-electric device 31a of a cantilever 32 that scans the surface of a specimen 33. A particular position of the surface of the specimen 33 is scanned by the cantilever 32 as a first scanning measurement. Thereafter, the piezo-electric device 31b is displaced by a predetermined amount d and the same position of the surface of the specimen 33 is scanned. Since the difference between the two measurement results becomes the difference $\{g(x+\Delta x)-g(x)\}$ of linearity errors of the follower piezo-electric device 31a, calibration curves are obtained in the data process according to the present invention.

Figure 25A:
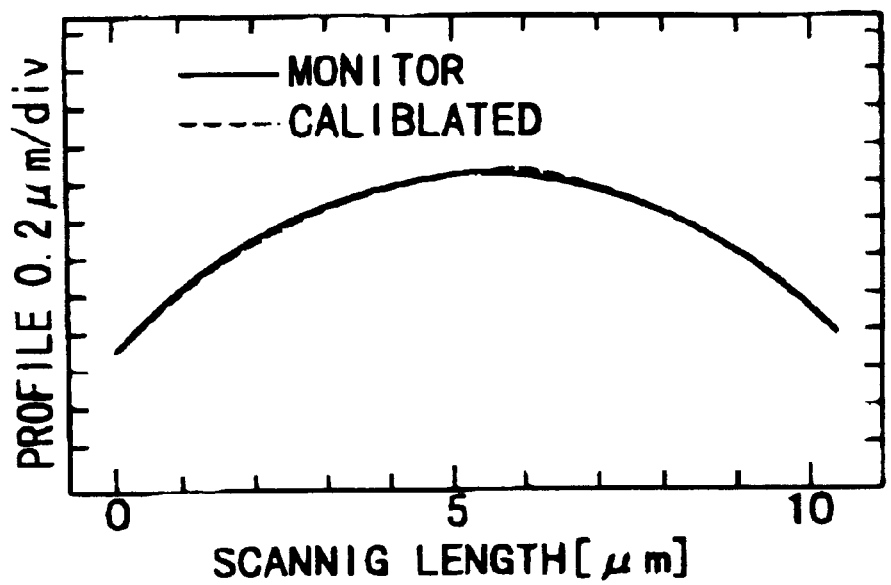
FIGS. 25A and 25B are graphs for comparing measured results in the application shown in FIGS. 24A and 24B corresponding to the present invention and a related art reference.
Figure 25B:
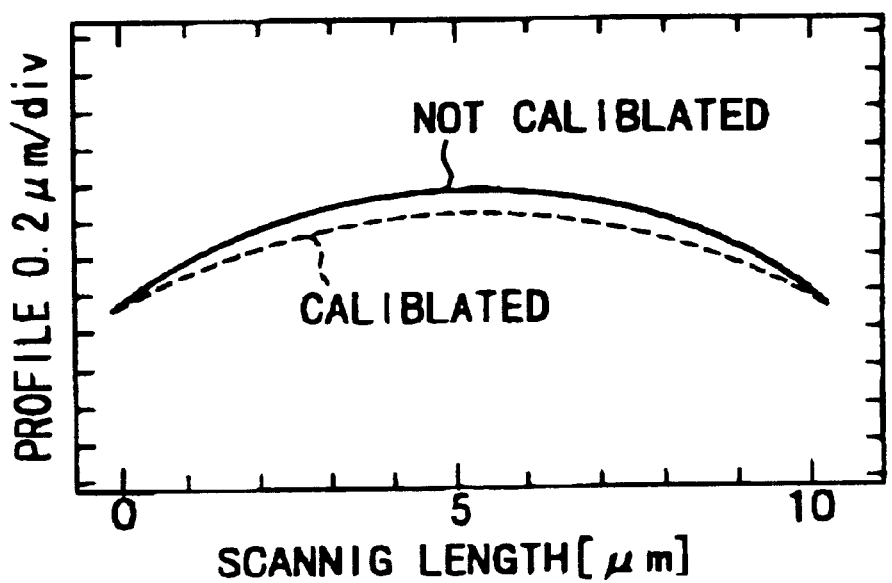

FIGS. 25A and 25B show results of calibrations of measured shapes with the obtained calibration curves. FIG. 25A shows both a measurement result obtained in a so-called external monitor method (in this method, the displacement of a monitor piezo-electric device that operates in the same manner as a follow piezo-electric device is mechanically enlarged and read by a displacement meter) and a calibration result according to the present invention. As shown in FIG. 25A, it is clear that the calibration results of the external monitor method and the method according to the present invention are well coincident. FIG. 25B shows a measurement result that has not been calibrated and a measurement result that has been calibrated. FIG. 25B represents the effectiveness of the present invention.

Figure 26:
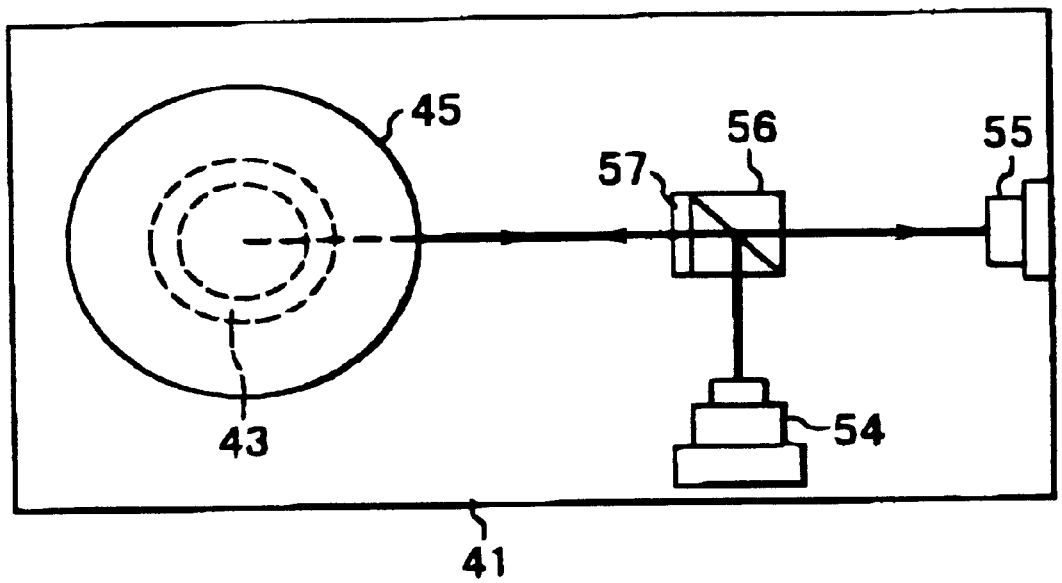
FIG. 26 is a plan view showing a calibration displacement input unit according to the present invention.
Figure 27:
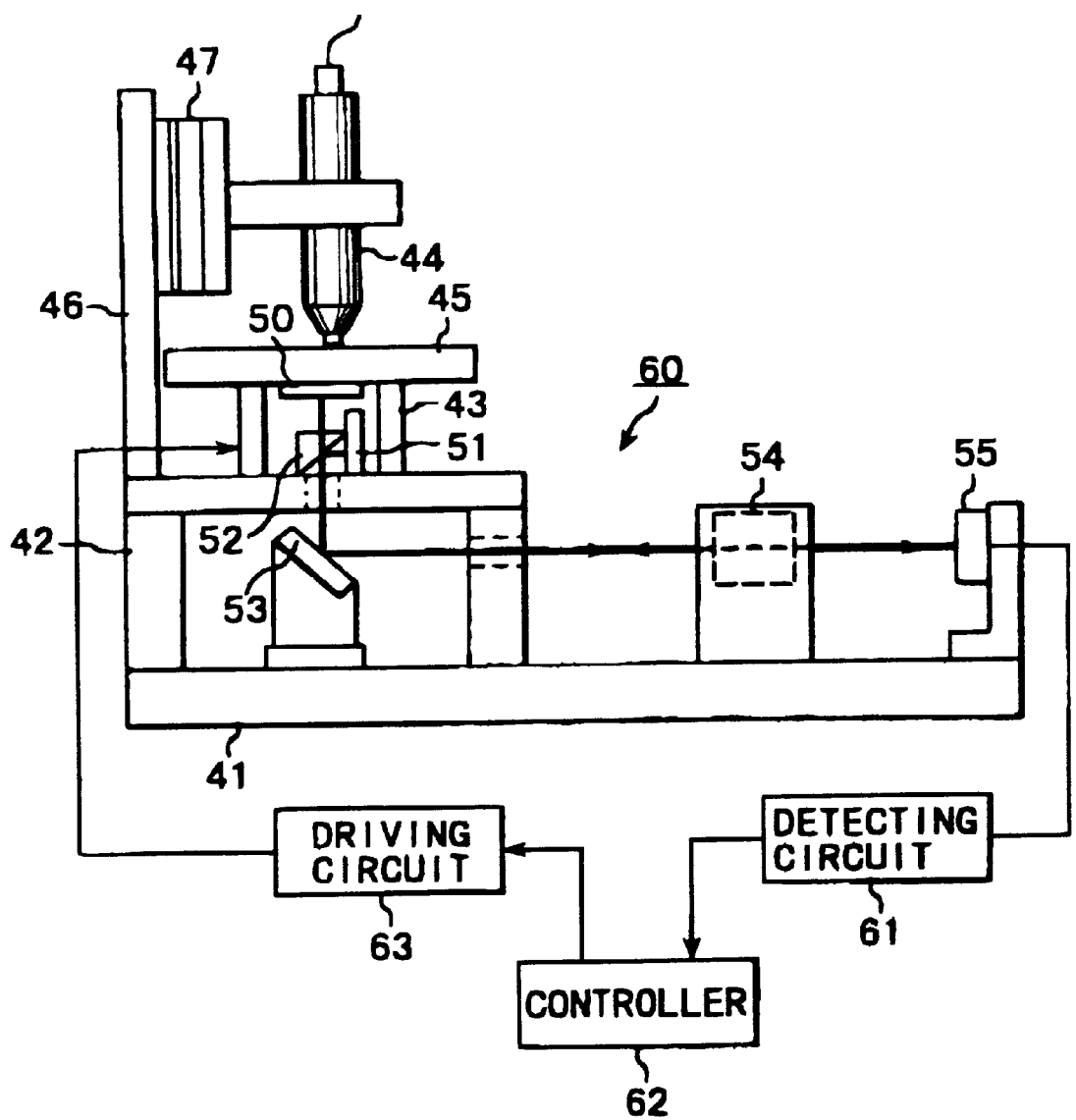
FIG. 27 is a plan view showing the calibration displacement input unit of FIG. 26.

FIGS. 26 and 27 show a preferable example of the structure of a displacement input unit which can be used for the self-calibration method for a sensor according to the present invention.

A supporting frame 42 is disposed on a base 41. A hollow-cylindrical piezo-electric actuator 43 is disposed on the supporting frame 42. The piezo-electric actuator 43 can be expanded and shrunk in the axis direction of the hollow cylinder. A disc-shaped jig 45 that displaces an object sensor 44 disposed at the upper edge of the piezo-electric actuator 43.

The object sensor 44 is, for example, a displacement sensor such as an electrostatic capacitance type displacement sensor. The sensor 44 is held at a particular position in the direction of the Z axis with a Z-axis sliding mechanism 47 disposed on a supporting pillar 46.

A laser interferometer 60 that controls the displacement of the jig 45 at pitches of interference fringes is disposed below the jig 45. A laser light source 54 of the laser interferometer 60 is a semiconductor laser. The laser light source 54 is disposed on the base 41. A plate beam splitter 56, a ¼ wavelength plate 57, and a mirror 53 that guide the laser light of the laser light source 54 to the rear surface of the jig 45 are disposed on the base 41. In addition, a cube beam splitter 52 is disposed on the supporting frame 42.

A moving mirror 50 is so disposed on the rear surface of the jig 45 as to displaces corresponding to the jig 45. The laser light vertically enters into the moving mirror 50. A reference mirror 51 integrally attached with the cube beam splitter 52 is disposed on the supporting frame 42. The reference mirror 51 has a reflection surface perpendicular to the moving mirror 50. The light branched by the cube beam splitter 52 vertically enters into the reference mirror 51. The difference of the lengths of the optical paths of the moving mirror 50 and the reference mirror 51 is 10 wavelengths or less. Thus, the light reflected by the moving mirror 50 and the reference mirror 51 is combined by the cube beam splitter 52, whereby interference fringes are generated. The interference fringes are obtained through the mirror 53, the ¼ wavelength plate, 57, and the plate beam splitter 56. A light receiving diodes 55 is disposed on the base 41 for receiving the interference light.

The output signal of the light receiving diode 55 is detected by a detecting circuit 61 that has a current-voltage converting circuit. The output signal of the detecting circuit 61 is sent to a controller 62. The controller 62 detects a zero-cross of interference fringes so as to generate and send a control signal corresponding to the detected result to a driving circuit 63. The driving circuit 63 supplies a drive voltage corresponding to the control signal to the piezoelectric actuator 43.

In such a case that it is necessary to temporarily hold the jig 45 at a predetermined position while input displacement is supplied to the jig 45, the controller 62 has a function for detecting a zero-cross point of interference fringes and locking the actuator 43 corresponding to the detected signal. Alternatively, the controller 62 may vibrate and displace the jig 45 in a predetermined range and use a zero-cross point detection signal as a trigger signal for obtaining calibration data.

Using the displacement input unit according to the embodiment, the average sensitivity Sm necessary for calibrating the linearity error of the above-described displacement sensor can be calibrated in situ in the linearity error calibration processing. In other words, by controlling the small displacement applied to the jig 45 at intervals of interference fringes of the laser interferometer 60, and by averaging the obtained data, the average sensitivity Sm can be accurately obtained.

In the conventional method, when the average sensitivity of a displacement sensor other than an interferometer is unknown, the average sensitivity should be measured with a stepped specimen. In contrast, according to the embodiment, with the laser interferometer 60 having the self-calibration jig, the average sensitivity can be calibrated along with the linearity error. In addition, since the average sensitivity is determined corresponding to the wavelength of the interferometer, the average sensitivity can be very accurately obtained.

In the case of a stepped specimen, the reliability of the measured data may be lost due to dust adhered thereto. In contrast, the laser interferometer does not have such a problem. In addition, since the laser interferometer 60 requires only the measurement of the maximum displacement of the actuator 43, the structure thereof is simple and compact. When the difference of optical paths of the interference arms is at most 10 wavelengths, the drift of the interference fringes can be suppressed to a small level.

In the above-described embodiment, with the calibration curve given by the expression (1), an approximate calculation for a derivative function based on the measurement data corresponding to a small displacement, integrating calculation for the derivative and converging calculations are performed. In contrast, an inverse function of the calibration function given by the expression (1) may be used as follows.

$$x = B(v) = v/Sm + T(v) \quad (13)$$

When such an inverse function is used, data is sampled in the same manner as the above-described embodiment. The small displacement $\Delta x$ may be likewise applied. With the measurement data vi, $\Delta vi$ and the small displacement $\Delta x$, the derivative function of the linearity error T(v) of the inverse function can be obtained by an approximate calculation given by the following expression (14).

$$T'(v) \approx \Delta x/\Delta vi - 1/Sm \quad (14)$$

By numerically integrating the obtained derivative function, the linearity error T(v) of the inverse function can be obtained.

In this case, unlike with the above-described embodiment, which directly uses the calibration curve given by the expression (1), it is not necessary to perform approximate calculations for input values on the assumption that there are no linearity errors. As a result, even if a linearity error is large, a large approximate error does no take place. Consequently, a calibration curve can be obtained without need to perform the convergence calculations that is necessary in the above-described embodiment.

The self-calibration method according to the present invention features:

(1) the linearity error of a single sensor can be self-calibrated without need to use additional units except that a particular small input (displacement) is added, (2) as long as input values are disposed at approximately uniform intervals in a calibration range, the input values may be neither always known values, nor at strictly uniform intervals, (3) even if an error that is larger than 10% of the measurement range, a linearity error can be calibrated with the maximum error around two times the resolution of the sensor, (4) even if input values systematically deviate, the sensor can be calibrated with weighted input values, and (5) when a linearity error has a high frequency component, a numerical integration should be performed with special care. However, against a linearity error with a period of around ⅓ of the full calibration range, a sufficient accuracy can be obtained by a middle point formula.

As described above, according to the self-calibration method of the present invention, the linearity error of a sensor can be calibrated by processing sampling data without need to use additional units. Thus, a sensor disposed in a unit can be calibrated on site without an extra space.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

The entire disclosure of Japanese Patent Application No. 9-142638 filed on May 30, 1997 including specification, claims, drawings and abstract are incorporated herein by reference in its entirety.

What is claimed is:

1. A self-calibration method for a sensor whose calibration curve is expressed by $f(x)=v=Sm \cdot x+g(x)$, where x represents an input value; v represents an output value; Sm represents an average sensitivity; and $g(x)$ represents a linearity error, the method comprising the steps of:

(a) sampling output values vi (where i=1, 2, ..., n) of the sensor at a plurality of first sampling points in a predetermined calibration range of the sensor;

(b) sampling output values $vi_+$ of the sensor at a plurality of second sampling points in the predetermined calibration range of the sensor, input interval between each of the first and second sampling points being $\Delta x$;

(c) calculating input approximation $x0i \approx vi/Sm$ at each of the first sampling points using the output values vi;

(d) calculating derivative approximation $g'0(x0i) \approx \Delta vi/\Delta x - Sm$ of the linearity errors $g(x)$ using difference $\Delta vi = vi_+ - vi$;

(e) numerically integrating the derivative approximation $g'0(x0i)$ so as to obtain linearity error approximation $g0(x) = \Sigma g'0(x0i)$ of the linearity error $g(x)$; and (f) repeatedly improving the linearity error approximation $g0(x)$ until a predetermined convergence condition is satisfied, in such a manner as to improve the input approximation $x0i$ using the linearity error approximation $g0(x)$, then improve the derivative approximation $g'0(x0i)$ using the resultant input approximation, and then improve the linearity error approximation $g0(x)$ using the resultant derivative approximation.

2. The self-calibration method according to claim 1, wherein the input interval $\Delta x$ is obtained by an average calculation of $Sm \cdot \Delta x = \Sigma \Delta vi/n$.

3. The self-calibration method according to claim 2, wherein when the intervals of the sampling points at steps (a) and (b) have a particular deviation, in the average calculation, the differences $\Delta vi$ are weighted correspondingly to the deviation of the sampling intervals.

4. The self-calibration method according to claim 3, wherein the input interval $\Delta x$ is obtained by an average calculation of $Sm \cdot \Delta x = \Sigma (xi+1-xi)\Delta vi/(xn-x1)$.

5. The self-calibration method according to claim 1, wherein the sensor is a metrological sensor.

6. The self-calibration method according to claim 5, wherein the metrological sensor is a displacement sensor.

7. The self-calibration method according to claim 1, wherein the sensor is a metrological sensor for measuring a surface displacement of a specimen, wherein step (a) is performed in such a state that a calibration specimen with an inclined surface is held at a first position, whereby the entire sensor output in the predetermined calibration range is obtained at a time, and wherein step (b) is performed in such a state that the calibration specimen is held at a second position that is moved from the first position to the direction of the measurement by $\Delta x$.

8. The self-calibration method according to claim 7, wherein the metrological sensor is an interference microscope, and the measurement surface of the calibration specimen, on which a light beam of the interference microscope is input, is formed as an inclined surface.

9. The self-calibration method according to claim 1, wherein the sensor is a metrological sensor for measuring a surface displacement of a specimen, and wherein steps (a) and (b) are performed at a time as a sequence of measurement operations for moving a calibration specimen with a step of $\Delta x$ on the surface in the predetermined calibration range and repeatedly measuring the surface displacement, two output values with the input interval $\Delta x$ being obtained at a time.

10. The self-calibration method according to claim 9, wherein the metrological sensor in an interference microscope, and a step of $\Delta x$ is formed on the measurement surface of the calibration specimen on which a light beam of the interference microscope is input.

11. A self-calibration method for a sensor whose calibration curve is expressed by $f(x)=v=Sm \cdot x+g(x)$, where x represents an input value; v represents an output value; Sm represents an average sensitivity; and $g(x)$ represents a linearity error, the method comprising the steps of:

(a) representing the calibration curve with an inverse function of $B(v)=x=v/Sm+T(v)$;

(b) sampling output values vi (where i=1, 2, ..., n) at a plurality of first sampling points in a predetermined calibration range of the sensor;

(c) sampling output values $vi_+$ at a plurality of second sampling points in the predetermined calibration range of the sensor, input interval between each of the first and second sampling points being $\Delta x$;

(d) calculating a derivative $T'(vi) \approx \Delta x/\Delta vi - 1/Sm$ of a linearity error $T(v)$ of the inverse function $B(v)$ using difference $\Delta vi = vi_+ - vi$; and (e) numerically integrating the derivative $T'(vi)$ so as to obtain the linearity error $T(v)$.

* * * * *